(No Model.)

G. L. POTTS.
ATTACHMENT FOR RAILWAY CARS.

No. 405,322. Patented June 18, 1889.

Witnesses.
A. Ruppert,
Chas. E. Brock,

Inventor.
George L. Potts
by Franklin H. Hough
Atty.

UNITED STATES PATENT OFFICE.

GEORGE L. POTTS, OF APPLETON, WISCONSIN.

ATTACHMENT FOR RAILWAY-CARS.

SPECIFICATION forming part of Letters Patent No. 405,322, dated June 18, 1889.

Application filed March 30, 1889. Serial No. 305,448. (No model.)

*To all whom it may concern:*

Be it known that I, GEORGE L. POTTS, a citizen of the United States, residing at Appleton, in the county of Outagamie and State of Wisconsin, have invented certain new and useful Improvements in Attachments for Railway-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in attachments to railway-cars. It is well known that in stormy weather when the tracks become slippery the wheels are very apt to slip on the rails and retard and sometimes prevent progress of the car.

The invention consists in the peculiar combinations and in the novel construction, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which—

Figure 1:
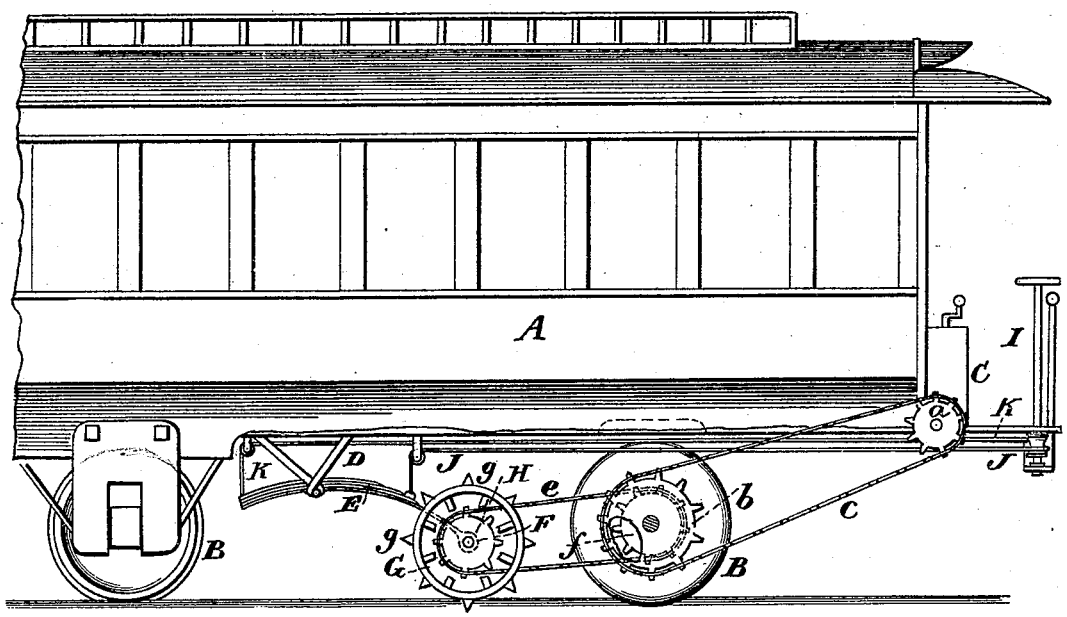
Figure 2:
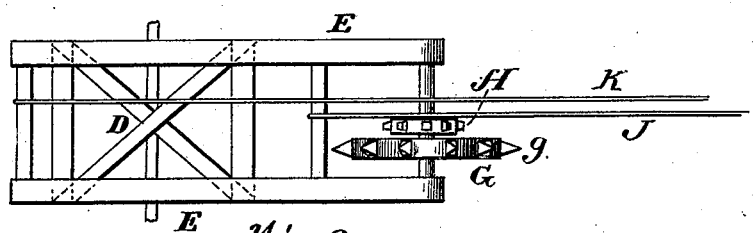
Figure 3:
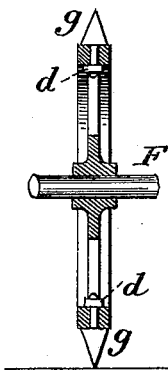

Figure 1 is a side view of a car with my improvement attached thereto. Fig. 2 is a top plan of the parts below the sills of the car. Fig. 3 is a section through the gripping-wheel parallel with the axis thereof.

Reference now being had to the details of the drawings by letter, A designates a car of known construction, such as is ordinarily used upon electric roads, and B are the wheels thereof.

C is a motor at one end of the car, by means of which motor motion is imparted to the car through the medium of the sprocket-wheel $a$, the sprocket-wheel $b$ on the axle of one of the wheels B, and the endless sprocket-chain $c$, connecting said sprocket-wheels, as shown.

Secured to the under side of the bottom or sill of the car are the brace-timbers D, to which are secured the springs E, preferably leaf-springs, as shown. These springs should be made very stout, and at one end are formed with suitable bearings for the shaft F, to which is secured the spiked wheel G, the spikes $g$ of which are detachably secured to the rim of the wheel by having their shanks screw-threaded, as shown, and passed through suitable openings in the rim of the wheel and provided with the nuts $d$, as shown. On this shaft F is a sprocket-wheel H, which is connected by the endless sprocket-chain $e$ with the sprocket-wheel $f$ on the axle of one of the wheels B, so that when motion is imparted to said axle motion is also given to the shaft F, which causes the spiked wheel G to rotate.

I is a vertical shaft on the end platform, provided with a hand-wheel, whereby it may be turned, and J are cords or chains connected at one end to the lower end of said shaft, and at the other end, after passing over a suitable pulley or pulleys on the bottom of the car, is attached to one of the springs E. By turning the shaft in the proper direction said cords are pulled on to raise the spiked wheel from the ground.

K are cords attached at one end to the said shaft I, and at the other, after passing over suitable pulleys on the bottom of the car, are attached to the ends of the springs E, opposite those to which the cords J are attached. By turning the shaft I, so as to wind up the cords K, the rear ends of the said springs are elevated and the other ends depressed, thus holding the spiked wheel G down upon the ground.

From the above description the operation of the invention will be readily understood and appreciated, and a further description thereof in this connection is not deemed necessary.

What I claim as new is—

1. The combination, with the car, of the springs attached thereto and the spiked wheel journaled in the free ends of said springs and connected with and operated by the driving-wheel of the car, substantially as shown and described.

2. The combination, with the car and the leaf-springs attached thereto and arranged substantially horizontally, as described, of the spiked wheel carried by said springs and the cords attached to said springs, and with a rotary shaft, whereby said cords may be actuated to raise or lower said spiked wheel, substantially as and for the purpose specified.

3. The combination, with the car, the springs attached to the under side thereof and arranged substantially horizontally, and the transverse shaft journaled in bearings at one end of said springs, of the spiked wheel on said shaft, the vertical shaft on the car, the cords attached at one end to said shaft and at the other to one end of said springs, and the cords attached to the other ends of said springs and to the vertical shaft, substantially as shown and described, and for the purpose specified.

In testimony whereof I affix my signature in presence of two witnesses.

GEORGE L. POTTS.

Witnesses:
JOHN BOTTENSEK,
EDWARD E. ENO.